United States Patent [19]

Sieber et al.

[11] Patent Number: 5,132,192

[45] Date of Patent: Jul. 21, 1992

[54] ORDERED CORUNDUM MAGNESIUM TANTALUM NIOBIUM OXIDE X-RAY INTENSIFYING SCREENS

[75] Inventors: Kurt D. Sieber, Rochester; Lisa B. Todd, Livonia; Byron R. Sever, Rochester, all of N.Y.

[73] Assignee: Eastman Kodak Company, Rochester, N.Y.

[21] Appl. No.: 607,937

[22] Filed: Nov. 1, 1990

Related U.S. Application Data

[63] Continuation-in-part of Ser. No. 257,910, Oct. 14, 1988, abandoned.

[51] Int. Cl.$^5$ .............................................. C09K 11/67
[52] U.S. Cl. .................... 428/690; 250/483.1; 252/301.4 R
[58] Field of Search .............. 252/301.4 R; 250/483.1; 428/690

[56] References Cited

U.S. PATENT DOCUMENTS

| | | | |
|---|---|---|---|
| 3,778,615 | 12/1973 | Luckey | 250/475 |
| 3,829,700 | 8/1974 | Buchanan et al. | 250/483 |
| 4,024,069 | 5/1977 | Larach | 252/301.4 R |
| 4,068,129 | 1/1978 | Rabatin | 250/483 |
| 4,225,653 | 9/1980 | Brixner | 428/539 |
| 4,259,588 | 3/1981 | Luckey et al. | 250/483 |
| 4,507,560 | 3/1985 | Mathers et al. | 250/483.1 |
| 4,790,024 | 11/1990 | Reddy | 252/301.4 R |

FOREIGN PATENT DOCUMENTS

24155 7/1973 Japan.

OTHER PUBLICATIONS

H. W. Leverenz *An Introduction to Luminescence of Solids*, John Wiley & Sons, New York, 1950, p. 165.

Kröger *Some Aspects of the Luminescence of Solids*, Elsevier Publishing, New York, 1948, pp. 77 & 78.

G. Blasse, G. J. Dirksen & L. H. Brixner, "Luminescence Properties of Uranium-Activated Lanthanum Halotungstate ($La_3WO_6Cl_3$-U)", Journal of Solid State Chemistry, 44, 162-168 (1982).

C. C. Torardi, C. Page, L. H. Brixner, G. Blasse & G. J. Dirksen, "Structure and Luminescence of Some $CsLnW_2O_8$ Compounds", Journal of Solid State Chemistry, 69, 1987, pp. 171-178.

Blasse, G. Bokkers, G. J. Dirksen & L. H. Brixner, "Luminescence in Lanthanum Chlorotungstate ($LaWO_4Cl$)", Journal of Solid State Chemistry, 46, 1983, pp. 215-221.

G. Blasse, G. J. Dirksen & L. H. Brixner, "Luminescence in Trilanthanumtrichlorotungstate ($La_3WO_6Cl_3$)", Journal of Solid State Chemistry, 46, 1983, pp. 294-305.

Journal of Solid State Chemistry 3, 69-74 (1971) entitled "Luminescence in Some Tantalate Host Lattices", G. Blasse & A. Bril.

Journal of Solid State Chemistry 72, 72-79 (1988) entitled "The Influence of Crystal Structure on the Luminescence of Tantalates and Niobates" G. Blasse.

Journal of Solid State Chemistry 19, 221-226 (1976) entitled "Luminescence in the System $Mg_4Ta_{2-x}Nb_xO_9$," A. J. H. Macke.

*Primary Examiner*—Jack Cooper
*Attorney, Agent, or Firm*—Carl O. Thomas

[57] ABSTRACT

An x-ray intensifying screen is disclosed containing magnesium tantalum niobium oxide as a phosphor in an ordered corundum crystalline form. In addition, small amounts of at least one alkali metal other than lithium can be present. Potassium, rubidium and cesium are each capable of increasing luminescence. The x-ray intensifying screens are useful in radiographic applications where it is important to reduce subject exposure to x-rays and also to create clear, sharp images.

14 Claims, 2 Drawing Sheets

ORDERED CORUNDUM MAGNESIUM TANTALUM NIOBIUM OXIDE X-RAY INTENSIFYING SCREENS

FIELD OF THE INVENTION

This invention relates to a class of materials highly suitable for radiography. It particularly relates to an x-ray intensifying screen utilized to minimize time of exposure to x-rays.

PRIOR ART

In the radiographic art, intensifying screens are used in order to diminish the time of exposure of an object in producing its image in a radiographic silver halide element. These intensifying screens comprise phosphors, i.e., substances which fluoresce under exposure to x-rays or other types of excitations, such as ultraviolet and gamma rays. Typical phosphors used in the preparation of radiographic intensifying screens include gadolinium oxysulfide, zinc sulfide, magnesium tungstate, barium lead sulfate, and yttrium tantalate. Calcium tungstate was the first widely used phosphor and remains a standard phosphor against which new x-ray intensifying screen phosphors are tested.

The effect and desirability of various phosphor-containing screens can be measured by the light intensity of the radiation given off by the screen upon exposure to x-ray radiation. Further, it is important that the screen have a high degree of brightness when being exposed to the x-rays but have little persistence of phosphorescence, also called afterglow, as any afterglow or persistent image will affect the quality of later x-ray photographs (radiographs) by causing ghost images.

There have been proposed other combinations of materials for use in x-ray intensifying screens, also called x-ray conversion screens. U.S. Pat. No. 3,829,700—Buchanan et al proposed that oxysulfides of lanthanum, gadolinium or lutetium activated with trivalent terbium be utilized. In U.S. Pat. No. 3,778,615—Luckey it is proposed that alkaline earth sulfates such as strontium barium sulfate activated with lanthanides be utilized. In U.S. Pat. No. 4,259,588—Luckey et al it is proposed that a blue light absorber be added to the x-ray intensifying screen. In U.S. Pat. No. 4,068,129—Rabatin it is proposed that oxybromides of lanthanum and gadolinium be utilized in x-ray image converters. In U.S. Pat. No. 4,507,560—Mathers et al a terbium-activated gadolinium oxysulfide x-ray intensifier is proposed.

The discovery of phosphors useful in the field of radiography and particularly as active components of x-ray intensifying screens has remained a trial and error process. It is not possible to predict the x-ray stimulated luminescence of a material based solely on the presence of one or even two or more particular elements. The crystal structure of a phosphor is at least equally important to successful stimulation as the particular choice of elements and in practice it is the selection of elements, their proportions and the crystal structure they form that controls whether a particular crystalline compound will luminesce when stimulated by x-radiation. Further, the presence of even minute amounts of additional elements can quench, enhance or dramatically shift the wavelength of stimulated emissions. Finally, a compound that can be efficiently stimulated by radiation of another wavelength (e.g., uv radiation) often will not respond with similar efficiency when stimulated by x-radiation.

H. W. Leverenz *An Introduction to Luminescence of Solids*, John Wiley & Sons, New York, 1950, p. 165, discloses rhombohedral $Zn_2SiO_4$:Mn (the reference standard phosphor for cathode ray excitation) to luminesce efficiently when stimulated by 254 nm radiation or cathode rays, but to luminesce only weakly when stimulated by x-rays.

Kroger *Some Aspects of the Luminescence of Solids*, Elsevier Publishing, New York, 1948, pp. 77 and 78, observes that cubic $Mg_2TiO_4$, with or without manganese activation, did not produce efficient luminescence when exposed to stimulating wavelengths shorter than 280 nm. In other words, uv stimulation was effective, but neither cathode ray nor x-ray stimulation was effective.

G. Blasse, G. J. Dirksen and L. H. Brixner, "Luminescence Properties of Uranium-Activated Lanthanum Halotungstate ($La_3WO_6Cl_3$-U)", Journal of Solid State Chemistry, 44, 162–168 (1982), reports that the title phosphor does not emit when exposed to radiation of wavelengths of less than 330 nm. In other word, uv stimulation was effective, but neither cathode ray nor x-ray stimulation was effective.

C. C. Torardi, C. Page, L. H. Brixner, G. Blasse and G. J. Dirksen, "Structure and Luminescence of Some $CsLnW_2O_8$ Compounds", Journal of Solid State Chemistry, 69, 1987, pp. 171–178, reports the behavior of title phosphors (Ln=Y, Eu, Gd, Lu), showing efficient emission with stimulated with uv radiation, but lower levels of excitation when stimulated with x-rays.

Articles by G. Blasse, G. Bokkers, G. J. Dirksen and L. H. Brixner, "Luminescence in Lanthanum Chlorotungstate ($LaWO_4Cl$)", Journal of Solid State Chemistry, 46, 1983, pp. 215–221 and by G. Blasse, G. J. Dirksen and L. H. Brixner, "Luminescence in Trilanthanum-trichlorotungstate ($La_3WO_6Cl_3$)", Journal of Solid State Chemistry, 46, 1983, pp. 294–305, demonstrate that the title phosphors, which differ solely in the ratios of the included elements, offer differing responses to stimulating radiation. The trichloride shows low efficiency with molybdenum activation while the monochloride does not. The trichloride shows inefficient emission with europium activation while the monochloride does not. The trichloride shows efficient emission when uranium or bismuth activated, but these activators are totally ineffective in the monochloride. Both the trichloride and the monochloride are efficiently activated by terbium. These results demonstrate that efficient activation cannot be predicted merely from considering the elements included in a phosphor apart from the proportions of the elements. In other words, these articles corroborate unpredictability.

Magnesium tantalates having an ordered corundum crystal structure have been long known in the art. In the investigations of these magnesium tantalates ultraviolet stimulation has been observed to produce luminescence. The luminescence of magnesium tantalates, and niobates has been discussed in literature articles: *Journal of Solid State Chemistry* 3, 69–74 (1971) entitled "Luminescence in Some Tantalate Host Lattices", authors G. Blasse and A. Bril; *Journal of Solid State Chemistry* 72, 72–79 (1988) entitled "The Influence of Crystal Structure on the Luminescence of Tantalates and Niobates" authored by G. Blasse; and *Journal of Solid State Chemistry* 19, 221–226 (1976) entitled "Luminescence in the System $Mg_4Ta_{2-x}Nb_xO_9$, author A. J. H. Macke. However, the literature does not disclose the utilization of magnesium tantalates or niobates for x-ray intensifying screens or report any observations of x-ray stimulated luminescence.

Some tantalum containing compounds other than those exhibiting an ordered corundum crystal structure have been recognized to luminesce when stimulated with x-rays. Yttrium tantalates in which a minor portion of the yttrium is replaced with at last one trivalent activator are disclosed by Larach U.S. Pat. No. 4,024,069. Niobium-activated and rare earth-activated yttrium, lutetium, and gadolinium tantalates are illustrated by Brixner U.S. Pat. No. 4,225,653. In addition, Tokyo Shibaura published Japanese application, Publication No. 24155/1973, published Jul. 19, 1973, discloses a manganese activated magnesium tantalate to be red emitting when stimulated by x-rays. This phosphor has a much higher ratio of magnesium to tantalum than can be accommodated within an ordered corundum crystal structure.

There remains a need for improved phosphors that are brighter than conventional blue emitting calcium tungstate phosphors. Further, there is a need for x-ray intensifying screens composed of stable chemical compounds that will not hydrolyze and do not require expensive forming techniques. Further, there is a need for improved x-ray intensifying screens that emit light in the wavelengths where the x-ray photographic films are sensitive. There is a particular need for improved phosphors that will emit in the blue region where silver halides have native light sensitivity.

THE INVENTION

An object of the invention is to overcome disadvantages of prior x-ray intensifying screens.

Another object of the invention is to provide improved x-ray intensifying screens that are easy to form.

A further object of the invention is to provide a stable x-ray intensifying screens that do not hydrolyze to a disadvantageous degree.

An additional object is to provide a primarily blue emitting x-ray intensifying screen.

These and other objects of the invention are generally accomplished by providing an x-ray intensifying screen comprised of a support and a fluorescent layer containing a polymeric binder and a particulate phosphor in an ordered corundum crystalline form consisting essentially of where
M is at least one of potassium, rubidium and cesium,
x is in the range of from $5 \times 10^{-4}$ to 0.5,
y is at least $2 \times 10^{-3}$, and
$y+y'$ is less than 1.0.

MODES OF PRACTICING THE INVENTION

The invention provides numerous advantages over prior x-ray intensifying phosphors and screens. The phosphors are bright enougth to be used in improved x-ray intensifying screens. The phosphors are prepared by heating in air and are stable compounds that do not exhibit hydrolysis problems. Another advantage is that the phosphors of the invention emit light primarily in the blue wavelength region of the spectrum where existing x-ray films are sensitive. Therefore, new films do not have to be formulated to take advantage of the improved x-ray intensifying screens of the invention. The screens of the invention will serve to improve the performance of the present films. These and other advantages of the invention will be apparent from the drawings and the description below.

Figure 1:
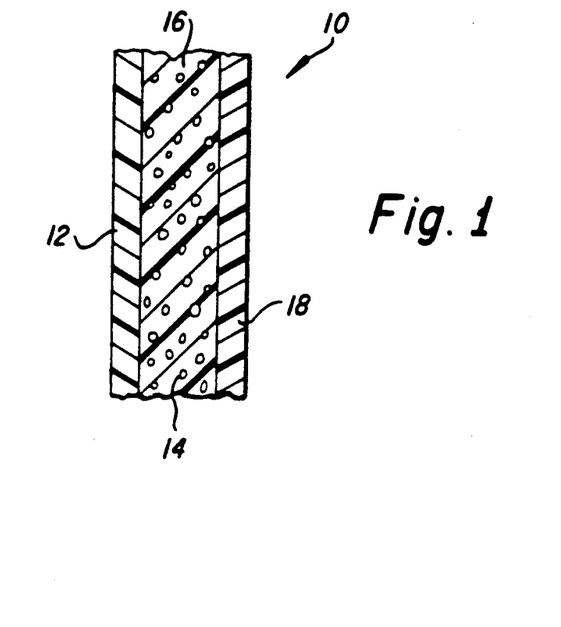
In FIG. 1 is a cross-section of an x-ray intensifying screen in accordance with the invention.

As illustrated in FIG. 1, an x-ray intensifying screen 10 is comprised of a support 12 onto which has been coated a fluorescent layer comprised of phosphor particles 14 imbedded in a matrix 16 comprised of a polymeric binder. Protective layer 18 guards the fluorescent layer from damage during use.

The x-ray intensifying screens of this invention employ phosphor particles exhibiting an ordered corundum crystal structure consisting essentially of where
M is at least one of potassium, rubidium and cesium,
x is in the range of from $5 \times 10^{-4}$ to 0.5,
y is at least $2 \times 10^{-3}$, and
$y+y'$ is less than 1.0.

It was initially discovered that ordered corundum crystal structures consisting essentially of magnesium tantalum oxide exhibit luminescence when stimulated with x-rays. Unfortunately, the levels of luminescence observed offered no significant advantage over those achievable with calcium tungstate, a well known blue emitting, phosphor. Upon further investigation it was observed that the substitution of even small amounts of niobium for tantalum in magnesium tantalum oxide is capable of enhancing x-ray stimulated luminescence to higher levels than those exhibited by calcium tungstate. The highest observed levels of luminescence have been achieved when x is the range of from $5 \times 10^{-3}$ to 0.1. However, very high, though declining, levels of luminescence are observed at values of x of 0.5—i.e., a displacement of half of the tantalum in the ordered corundum crystal structure by niobium. However, when low levels of tantalum are substituted for niobium in an ordered corundum magnesium niobium oxide crystal structure, much lower levels of luminescence are observed than those of either calcium tungstate or ordered corundum magnesium tantalum oxide.

In initial preparations of the phosphors above mixed oxides of magnesium, niobium and tantalum were employed and firing was undertaken in the absence of a flux. Subsequently, a process of phosphor preparation was devised employing potassium sulfate as a flux. It has now been observed that potassium introduced to provide a flux during firing acts further to enhance x-ray stimulated luminescence. From separate substitutions of lithium and sodium for potassium it has been determined that the presence of lithium acts to reduce luminescence sharply to levels well below ordered corundum magnesium tantalum oxide crystals. The presence of sodium reduces luminescence also, but to a lesser extent than lithium, so that with optimum niobium levels the ordered corundum magnesium niobium tantalum oxide crystals are capable of still exceeding the x-ray stimulated luminescence of calcium tungstate. The heavier alkali metals rubidium and cesium each have been observed to exhibit enhancement of x-ray stimulated luminescence properties similar to that of potassium. Combinations of potassium and each of rubidium and cesium have been demonstrated to be as effective as employing any one of the elements separately. It is therefore contemplated to employ potassium, rubidium, cesium or any combination thereof for enhancement of x-ray stimulated luminescence. Using combinations of sodium and potassium, x-ray stimulated luminescence levels comparable to those achieved with potassium alone have been observed when niobium as well as tantalum are present in the ordered corundum crystal structure. Therefore combinations of sodium with any one or combination of the alkali metals potassium, rubidium and cesium is specifically contemplated. However, combinations of lithium and potassium have been observed to reduce luminescence even more than lithium alone. Identification of the phosphor compositions capable of yielding higher x-ray stimulated luminescence levels than calcium tungstate could not have been accurately distinguished from the similar compositions yielding lower levels of luminescence when x-ray stimulated in the absence of actual investigations.

From investigations of varied phosphor compositions of which the examples below are representative, it has been concluded that the amount of the alkali metal or metals represented by M in formula I (i.e., y) is preferably at least $2 \times 10^{-3}$ with the combined amounts of M and Na not exceeding 0.5—i.e., $y+y'$ is preferably up to 0.5. Optimally y is at least $5 \times 10^{-3}$ and $y+y'$ is up to 0.2. When any one or combination of potassium, rubidium and cesium is present within these preferred and optimum ranges x-ray stimulated luminescence well above that obtained with calcium tungstate has been demonstrated.

The ordered corundum magnesium tantalum niobium oxide crystal structure phosphors can be made by conventional ceramic powder processing. This involves the mixing of the proper molar proportions of magnesium oxide, tantalum oxide and niobium oxide by grinding in a mortar to fine particle size and then firing to about 1400° C., optionally with intermediate grinding and refiring. The materials also may be processed with a flux at lower firing temperatures. Alkali metal salts capable of decomposing to the corresponding alkali metal oxide at temperatures up to about 1000° C. are particularly useful as fluxing agents. An excess of the alkali metal can be tolerated during firing without adverse effect. Specific illustrations of phosphor preparation are procedures are provided in the examples below. After firing, the particles are ground to a particle size suitable for forming the x-ray intensifying screens of the invention. The median particle size utilized is generally between about 0.5 and about 40 microns. A median particle size of between 1 and about 20 microns is preferred for ease of screen formulation, as well as optimizing the screen properties, such as speed, sharpness and noise.

The intensifying screens of the invention containing the magnesium tantalum niobium oxide phosphor are formed by conventional coating techniques where the powders are mixed with a solution of a resin binder material and coated by means such as blade coating onto a substrate. The magnesium tantalum niobium oxide containing layer of the invention then may be overcoated with a protective layer. It is understood that both the protective layer, and the resin forming the matrix into which the phosphor particles are held are preferably formed of transparent resins that do not interfere with the passage of either x-rays or the emitted light from the phosphors.

While it is in theory possible to prepare a luminescent layer that does not contain any ingredient other than the phosphor itself, in the luminescent layer of an intensifying screen contains in addition to phosphor particles a polymeric binder to give structural coherence to the phosphor layer. In general the binders useful in the practice of the invention are those conventionally employed in the art. Binders are generally chosen from a wide variety of known organic polymers which are transparent to X radiation and emitted light. Binders commonly employed in the art include sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); and poly(urethane) elastomers. These and other useful binders are disclosed in U.S. Pat. Nos. 2,502,529; 2,887,379; 3,617,285; 3,300,310; 3,300,311; and 3,743,833; and in *Research Disclosure*, Vol. 154, February 1977, Item 15444, and Vol. 182, June 1979. *Research Disclosure* is published by Kenneth Mason Publications, Ltd., Emsworth, Hampshire PO10 7DD, England. Particularly preferred binders are poly(urethanes), such as those commercially available under the trademark Estane from Goodrich Chemical Co., the trademark Permuthane from the Permuthane Division of ICI, and the trademark Cargill from Cargill, Inc.

Any conventional ratio of phosphor to binder can be employed. Generally thinner phosphor layers and sharper images are realized when a high weight ratio of phosphor to binder is employed. Preferred phosphor to binder ratios are in the range of from about 7:1 to 25:1 for screen constructions intended to withstand commercial screen exposure repetitions without loss of structural integrity. For limited or single exposure applications it is, of course, appreciated that any minimal amount of binder consistent with structural integrity is satisfactory.

In those instances in which it is desired to reduce the effective thickness of a phosphor layer below its actual thickness the phosphor layer is modified to impart a small, but significant degree of light absorption. If the binder is chosen to exhibit the desired degree of light absorption, then no other ingredient of the phosphor layer is required to perform the light attenuation function. For example, a slightly yellow polymer will absorb a significant fraction of phosphor emitted blue light. Ultraviolet absorption can be similarly achieved. It is specifically noted that the less structurally complex chromophores for ultraviolet absorption particularly lend themselves to incorporation in polymers.

In most instances a separate absorber is incorporated in the phosphor layer to reduce its effective thickness. The absorber can be a dye or pigment capable of absorbing light within the spectrum emitted by the phosphor. Yellow dye or pigment selectively absorbs blue light emissions and is particularly useful with a blue emitting phosphor. On the other hand, a green emitting phosphor is better used in combination with magenta dyes or pigments. Ultraviolet emitting phosphors can be used with known ultraviolet absorbers. Black dyes and pigments are, of course, generally useful with phosphors, because of their broad absorption spectra. Carbon black is a preferred light absorber for incorporation in the phosphor layers. Luckey and Cleare U.S. Pat. No. 4,259,588, here incorporated by reference, teaches that increased sharpness (primarily attributable to reduced crossover, discussed below) can be achieved by incorporating a yellow dye in a terbium-activated gadolinium oxysulfide phosphor layer.

Apart from the phosphor layers and the assembly features described above, the screen can be of any conventional construction. The screen supports are most commonly film supports of high dimensional integrity, such as poly(ethylene terephthalate) film supports. For best image definition, when the front screen support and subbing and anticurl layers are transparent, the phosphor layer either contains an absorber or a black surface is positioned adjacent to the anticurl layer during exposure. For example, a black poly(vinyl chloride) or paper sheet can be positioned adjacent to the anticurl layer. Typically the adjacent interior surface of the cassette in which the assembly is mounted is a black polyurethane (or similar polymeric) foam layer, which can be relied upon for light absorption contributing to image sharpness. When the screen supports are not themselves black, best sharpness levels are realized when a black film or paper is interposed between the cassette and each screen of the image recording assembly. Independently of cassette construction the front screen support and/or its subbing and anticurl layers can be black or suitably colored to absorb emitted light, thereby minimizing light reflection and image sharpness degradation. The back screen support as well as its subbing and anticurl layers can be of the same form as described for the front screen. If desired to increase speed, both the front and back screen supports and/or their subbing and anticurl layers can be reflective of emitted light.

For example, a blue or white back screen support can be chosen to reflect light emitted by calcium tungstate or rare earth-activated yttrium tantalate or a green or white support can be chosen to reflect light emitted from a rare earth-activated lutetium or gadolinium oxysulfide phosphor. Titania is preferably coated on or incorporated in the front and back screen supports to maximize reflection of green light. Metal layers, such as aluminum, can be used to enhance reflection. Paper supports, though less common for intensifying screens than film supports, are known and can be used for specific applications. Dyes and pigments are commonly loaded into supports to enhance absorption or reflection of light. Air can be trapped in supports to reflect ultraviolet and visible light. Intensifying screen supports and the subbing layers used to improve coating adhesion can be chosen from among those employed for silver halide photographic and radiographic elements, as illustrated by *Research Disclosure*, Vol. 176, December 1978, Item 17643, Section XVII, and *Research Disclosure*, Vol. 184, August 1979, Item 18431, Section I, the disclosures of which are here incorporated by reference.

An overcoat, though not required, is commonly located over the phosphor layer for humidity and wear protection. The overcoat can be chosen using the criteria described above for the binder. The overcoat can be chosen from among the same polymers used to form either the screen binder or the support, with the requirements of toughness and scratch resistance usually favoring polymers conventionally employed for film supports. For example, cellulose acetate is a preferred overcoat used with the preferred poly(urethane) binders. Overcoat polymers are often used also to seal the edges of the phosphor layer.

While anticurl layers are not required for the screens, they are generally preferred for inclusion. The function of the anticurl layer is to balance the forces exerted by the layers coated on the opposite major surface of the screen support which, if left unchecked, cause the screen to assume a non-planar configuration—e.g., to curl or roll up on itself. Materials forming the anticurl layers can be chosen from among those identified above for use as binders and overcoats. Generally an anticurl layer is formed of the same polymer as the overcoat on the opposite side of the support. For example, cellulose acetate is preferred for both overcoat and anticurl layers.

To prevent blocking, particularly adhesion of the radiographic element and intensifying screen, the overcoats of the phosphor layers can include a matting agent, although matting agents are more commonly included in radiographic elements than in screens. Useful matting agents can be chosen from among those cited by *Research Disclosure*, Item 17643, cited above, Section XVI. A variety of other optional materials can be included in the surface coatings of the intensifying screens, such as materials to reduce static electrical charge accumulation, plasticizers, lubricants, and the like, but such materials are more commonly included in the radiographic elements which come into contact with the intensifying screens.

EXAMPLES

The practice of this invention can be further appreciated by reference to the following examples. The example subscript (c) indicates that the example does not satisfy the requirements of the invention and is provided solely for the purpose of comparison. When the concentration of niobium is provided as mole percent, this value can be converted to value x used in formula (I) simply by dividing the mole percent niobium by 100. The amounts of starting materials for forming the phosphors are in each instance reported in grams.

EXAMPLES A-E AND 1-49

In these examples the subscripts A to E are added to the example number to indicate a niobium level corresponding to that of corresponding example A to E.

Method of Sample Evaluation

All phosphor preparations were characterized for phase purity and lattice parameters using x-ray powder diffraction. Samples were characterized as pure if the only phases present were the hexagonal (ordered corundum) phase or the hexagonal phase in combination with small amounts of starting materials. X-ray powder diffraction patterns were taken using an Enraf Nonius Guinier-DeWolff model 552 TM camera. Patterns were taken using the K alpha 1 line of copper. The guinier film was digitized using a scanning densitometer, and line positions were corrected using silver as an internal standard. Lattice constants were calculated for the hexagonal phase using a least squares method. The a-axis and c-axis lattice constants are reported in Angstroms.

Prompt emission spectra and relative emissive power under x-ray excitation were measured on samples of phosphors packed into planchettes which were 2.54 cm (1 inch) in diameter and 0.64 cm (0.25 inch) thick. The x-rays from a tungsten tube operating at 28 kVp and 30 mA passed through 1.31 mm Al and 0.05 mm Mo filters before exciting the sample. The luminescent emission was detected by a spectrometer which has been calibrated to within ±0.5 nm with a resolution of better than 2 nm (full width at half maximum). The intensity calibration was performed using two NBS-traceable sources, which yielded an arbitrary intensity scale proportional to Watts/nm/cm². The integrated emission intensity of a spectral region is calculated by adding all data points within this region and multiplying by the bandwidth of the region. The region used in the examples below is from 300 nm to 550 nm. The x-ray excited prompt emission of the samples was measured by recording the voltage of an IP-28 TM photomultiplier when it was exposed to the light emitted by the sample irradiated by filtered x-rays from a tungsten x-ray source operating at 70 kVp and 10 mA. The filtration used for these experiments was 0.5 mm Cu and 1 mm Al.

The composition of the samples was established by a combination of x-ray fluorescence techniques and laser induced mass spectra. Standard compounds were prepared for calibration of the x-ray fluorescence measurements, and presence of the lighter elements was established by laser induced mass spectra. Laser induced mass spectra for negative ions were also used to verify that no anions other than oxygen were present in the samples. The absence of any foreign anions in the negative ion spectra demonstrated that all phases found in the examples reported below were oxide phases.

EXAMPLES A-E

These examples have as their purpose to demonstrate the effect of niobium on performance in the absence of an alkali metal activator. Compounds satisfying the general formula $$Mg_4Ta_{2-2x}Nb_{2x}O_9$$

were prepared by heating the quantities (indicated in grams) of intimately mixed powders indicated in Table I below for 12 hours at 1400° C. in alumina crucibles.

TABLE I

| Example | mol % Nb | MgO | Ta₂O₅ | Nb₂O₅ |
|---|---|---|---|---|
| A (c) | 0 | 1.693 | 4.419 | 0.000 |
| B | 1 | 1.693 | 4.375 | 0.027 |
| C | 50 | 1.693 | 2.209 | 1.329 |
| D (c) | 99 | 2.540 | 0.066 | 3.947 |
| E (c) | 100 | 2.540 | 0.000 | 3.987 |

X-ray powder diffraction analysis was carried out on Examples A-E. The cell parameters of the hexagonal (ordered corundum crystalline) phase were calculated for each example. The results are shown below in Table II.

TABLE II

| Example | mol % Nb | a-axis | c-axis | Pure |
|---|---|---|---|---|
| A (c) | 0 | 5.1618 | 14.0465 | Yes |
| B | 1 | 5.1618 | 14.0441 | Yes |
| C | 50 | 5.1613 | 14.0342 | Yes |
| D (c) | 99 | 5.1630 | 14.0252 | No |
| E (c) | 100 | 5.1629 | 14.0199 | No |

The impurity in examples D and E was Mg₅Nb₄O₁₅. The major phase in all cases was the hexagonal phase. The cell parameters found in example A were in excellent agreement with those previously published.

Table III below shows the results for the x-ray excited luminescence of examples A-E. All materials in examples A-E emit between 350 and 500 nm. The % Nb Ref. column in Table III merely sets the luminescence of each of examples A-E equal to 100. In the subsequent tables this column references the performance of alkali metal doped phosphors to the performance of examples A-E having the same niobium content.

TABLE III

| | Emissive Power | | |
|---|---|---|---|
| Example | Measured | % Nb Ref. | % CaWO₄ |
| A (c) | 820 | 100 | 65 |
| B | 2255 | 100 | 179 |
| C | 1825 | 100 | 145 |
| D (c) | 476 | 100 | 38 |
| E (c) | 758 | 100 | 60 |

Table III demonstrates that the inclusion of niobium in concentrations of up to 50 mole percent (x=0.5) in $Mg_4Ta_{2-2x}Nb_{2x}O_9$ markedly increased luminescence. Further, luminescence was increased over that obtained from a calcium tungstate phosphor (Sylvania type 2402) used as a standard.

Examples 1-5

These examples have as their purpose to demonstrate the effect of preparing the phosphors of Examples A-E in the presence of lithium. The presence of lithium during phosphor preparation sharply curtails luminescence.

Examples 1-5 were similar to Examples A-E, except for variances in starting materials and performance noted in Tables IV, V and VI, which correspond to Tables I-III above and the modification of firing for 3 hours at 1250° C. followed by washing with water after cooling.

TABLE IV

| Example | mol % Nb | MgO | Ta₂O₅ | Nb₂O₅ | Li₂SO₄ |
|---|---|---|---|---|---|
| 1A (c) | 0 | 1.693 | 4.419 | 0.000 | 6.112 |
| 2B (c) | 1 | 1.693 | 4.375 | 0.027 | 6.094 |
| 3C (c) | 50 | 1.693 | 2.209 | 1.329 | 5.232. |
| 4D (c) | 99 | 2.540 | 0.066 | 3.947 | 6.553 |
| 5E (c) | 100 | 2.540 | 0.000 | 3.987 | 6.527 |

TABLE V

| Example | mole % Nb | a-axis | c-axis | Pure |
|---|---|---|---|---|
| 1A (c) | 0 | 5.1607 | 14.0500 | No |
| 2B (c) | 1 | 5.1590 | 14.0460 | No |
| 3C (c) | 50 | 5.1617 | 14.0342 | No |
| 4D (c) | 99 | 5.1603 | 14.0498 | Yes |
| 5E (c) | 100 | 5.1622 | 14.0240 | Yes |

TABLE VI

| | Emissive Power | | |
|---|---|---|---|
| Example | Measured | % Nb Ref. | % CaWO₄ |
| 1A (c) | 332 | 40 | 26 |
| 2B (c) | 612 | 27 | 49 |
| 3C (c) | 91 | 5 | 7 |
| 4D (c) | 0 | 0 | 0 |
| 5E (c) | 21 | 3 | 2 |

From the performance reported in Table VI, it is apparent that the incorporation of any significant amount of lithium in the phosphor is incompatible with obtaining enhanced luminescence.

Examples 6-10

These examples have as their purpose to demonstrate the effect of preparing the phosphors of Examples A-E in the presence of sodium.

Examples 6-10 were repetitions of Examples 1-5, except for variances in starting materials and performance noted in Tables VII, VIII and IX, which correspond to Tables I-III above.

TABLE VII

| Example | mol % Nb | MgO | $Ta_2O_5$ | $Nb_2O_5$ | $Na_2SO_4$ |
|---|---|---|---|---|---|
| 6A (c) | 0 | 1.693 | 4.419 | 0.000 | 6.112 |
| 7B | 1 | 1.693 | 4.375 | 0.027 | 6.094 |
| 8C | 50 | 1.693 | 2.209 | 1.329 | 5.232 |
| 9D (c) | 99 | 2.540 | 0.066 | 3.947 | 6.553 |
| 10E (c) | 100 | 2.540 | 0.000 | 3.987 | 6.527 |

TABLE VIII

| Example | mol % Nb | a-axis | c-axis | Pure |
|---|---|---|---|---|
| 6A (c) | 0 | 5.1612 | 14.0425 | No |
| 7B | 1 | 5.1617 | 14.0428 | No |
| 8C | 50 | 5.1617 | 14.0312 | No |
| 9D (c) | 99 | 5.1628 | 14.0235 | Yes |
| 10E (c) | 100 | 5.1617 | 14.0208 | Yes |

TABLE IX

| Example | Emissive Power Measured | % Nb Ref. | % $CaWO_4$ |
|---|---|---|---|
| 6A (c) | 808 | 99 | 64 |
| 7B | 2071 | 92 | 164 |
| 8C | 1138 | 62 | 90 |
| 9D (c) | 410 | 86 | 33 |
| 10E (c) | 379 | 50 | 30 |

From the foregoing results it is clear that sodium acts to decrease luminescence. However, since the decrease in luminescence is small, by using optimum or near optimum amounts of niobium, the luminescence of the phosphor can still remain higher than that of a reference calcium tungstate phosphor. Thus, magnesium tantalum niobium oxide phosphors containing sodium are within the contemplation of the invention.

Examples 11-15

These examples have as their purpose to demonstrate the effect of preparing the phosphors of Examples A-E in the presence of potassium.

Examples 11-15 were repetitions of Examples 1-5, except for variances in starting materials and performance noted in Tables X, XI and XII, which correspond to Tables I-III above.

TABLE X

| Example | mol % Nb | MgO | $Ta_2O_5$ | $Nb_2O_5$ | $K_2SO_4$ |
|---|---|---|---|---|---|
| 11A (c) | 0 | 1.693 | 4.419 | 0.000 | 6.112 |
| 12B | 1 | 1.693 | 4.375 | 0.027 | 6.094 |
| 13C | 50 | 1.693 | 2.209 | 1.329 | 5.232 |
| 14D (c) | 99 | 2.540 | 0.066 | 3.947 | 6.553 |
| 15E (c) | 100 | 2.540 | 0.000 | 3.987 | 6.527 |

TABLE XI

| Example | mol % Nb | a-axis | c-axis | Pure |
|---|---|---|---|---|
| 11A (c) | 0 | 5.1607 | 14.0411 | Yes |
| 12B | 1 | 5.1619 | 14.0442 | Yes |
| 13C | 50 | 5.1616 | 14.0345 | Yes |
| 14D (c) | 99 | 5.1626 | 14.0231 | No |
| 15E (c) | 100 | 5.1623 | 14.0190 | No |

TABLE XII

| Example | Emissive Power Measured | % Nb Ref. | % $CaWO_4$ |
|---|---|---|---|
| 11A (c) | 1410 | 172 | 112 |
| 12B | 2783 | 123 | 221 |
| 13C | 1659 | 91 | 132 |
| 14D (c) | 1214 | 255 | 96 |
| 15E (c) | 1119 | 148 | 89 |

From the foregoing results it is clear that potassium increases x-ray stimulated luminescence. Potassium acts as an activator for magnesium tantalum oxide which does not contain niobium, raising emissions to higher levels than those demonstrated by the calcium tungstate reference. When potassium is present in magnesium tantalum niobium oxide, higher levels of emission are observed than in the calcium tungstate reference. Potassium increases emission to high levels and beyond those obtained by inclusion of niobium alone when lower levels of niobium (i.e., the preferred levels of niobium previously identified) are employed.

Examples 16-20

These examples have as their purpose to demonstrate the effect of preparing the phosphors of Examples A-E in the presence of rubidium.

Examples 16-20 were repetitions of Examples 1-5, except for variances in starting materials and performance noted in Tables XIII, XIV and XV, which correspond to Tables I-III above.

TABLE XIII

| Example | mol % Nb | MgO | $Ta_2O_5$ | $Nb_2O_5$ | $Rb_2SO_4$ |
|---|---|---|---|---|---|
| 16A(c) | 0 | 1.693 | 4.419 | 0.000 | 6.112 |
| 17B | 1 | 1.693 | 4.375 | 0.027 | 6.094 |
| 18C | 50 | 1.693 | 2.209 | 1.329 | 5.232 |
| 19D(c) | 99 | 2.540 | 0.066 | 3.947 | 6.553 |
| 20E(c) | 100 | 2.540 | 0.000 | 3.987 | 6.527 |

TABLE XIV

| Example | mol % Nb | a-axis | c-axis | Pure |
|---|---|---|---|---|
| 16A(c) | 0 | 5.1618 | 14.0444 | Yes |
| 17B | 1 | 5.1622 | 14.0440 | Yes |
| 18C | 50 | 5.1616 | 14.0320 | Yes |
| 19D(c) | 99 | 5.1622 | 14.0213 | Yes |
| 20E(c) | 100 | 5.1624 | 14.0124 | Yes |

TABLE XV

| Example | Emissive Power Measured | % Nb Ref. | % $CaWO_4$ |
|---|---|---|---|
| 16A(c) | 1106 | 135 | 88 |
| 17B | 2810 | 125 | 223 |
| 18C | 1737 | 95 | 138 |
| 19D(c) | 763 | 160 | 61 |
| 20E(c) | 1082 | 143 | 86 |

From a comparison of Tables XII and XV it is apparent that the performance of rubidium compares favorably to potassium at preferred niobium levels.

Examples 21-25

These examples have as their purpose to demonstrate the effect of preparing the phosphors of Examples A-E in the presence of cesium.

Examples 21-25 were repetitions of Examples 1-5, except for variances in starting materials and performance noted in Tables XVI, XVII and XVIII, which correspond to Tables I-III above.

TABLE XVI

| Example | mol % Nb | MgO | $Ta_2O_5$ | $Nb_2O_5$ | $Cs_2SO_4$ |
|---------|----------|-------|-----------|-----------|------------|
| 21A(c)  | 0        | 1.693 | 4.419     | 0.000     | 6.112      |
| 22B     | 1        | 1.693 | 4.375     | 0.027     | 6.094      |
| 23C     | 50       | 1.693 | 2.209     | 1.329     | 5.232      |
| 24D(c)  | 99       | 2.540 | 0.066     | 3.947     | 6.553      |
| 25E(c)  | 100      | 2.540 | 0.000     | 3.987     | 6.527      |

TABLE XVII

| Example | mol % Nb | a-axis | c-axis  | Pure |
|---------|----------|--------|---------|------|
| 21A(c)  | 0        | 5.1602 | 14.0389 | Yes  |
| 22B     | 1        | 5.1610 | 14.0420 | Yes  |
| 23C     | 50       | 5.1618 | 14.0340 | Yes  |
| 24D(c)  | 99       | 5.1627 | 14.0228 | Yes  |
| 25E(c)  | 100      | 5.1610 | 14.0165 | Yes  |

TABLE XVIII

| Example | Emissive Power Measured | % Nb Ref. | % $CaWO_4$ |
|---------|-------------------------|-----------|------------|
| 21A(c)  | 1631                    | 199       | 129        |
| 22B     | 3284                    | 146       | 260        |
| 23C     | 1587                    | 87        | 126        |
| 24D(c)  | 1200                    | 252       | 95         |
| 25E(c)  | 1252                    | 165       | 99         |

From the foregoing results it is clear that cesium acts to increase x-ray stimulated luminescence. Cesium in magnesium tantalum oxide which does not contain niobium, raises emissions to higher levels than those demonstrated by the calcium tungstate reference. When cesium is present in magnesium tantalum niobium oxide, higher levels of emission are observed than in the calcium tungstate reference. Cesium increases emission to high levels and beyond those obtained by inclusion of niobium alone when lower levels of niobium (i.e., the preferred levels of niobium previously identified) are employed. At lower niobium levels cesium achieves significantly higher levels of emission than those realized employing potassium.

Examples 26-30

These examples have as their purpose to demonstrate the effect of preparing the phosphors of Examples A-E in the presence of equal amounts of sodium and potassium.

Examples 26-30 were repetitions of Examples 1-5, except for variances in starting materials and performance noted in Tables XIX, XX and XXI, which correspond to Tables I-III above.

TABLE XIX

| Example | mol % Nb | MgO   | $Ta_2O_5$ | $Nb_2O_5$ | $K_2SO_4$ | $Na_2SO_4$ |
|---------|----------|-------|-----------|-----------|-----------|------------|
| 26A(c)  | 0        | 1.693 | 4.419     | 0.000     | 3.056     | 3.056      |
| 27B     | 1        | 1.693 | 4.375     | 0.027     | 3.047     | 3.047      |
| 28C     | 50       | 1.693 | 2.209     | 1.329     | 2.616     | 2.616      |
| 29D(c)  | 99       | 2.540 | 0.066     | 3.947     | 3.277     | 3.277      |
| 30E(c)  | 100      | 2.540 | 0.000     | 3.987     | 3.263     | 3.263      |

TABLE XX

| Example | mol % Nb | a-axis | c-axis  | Pure |
|---------|----------|--------|---------|------|
| 26A(c)  | 0        | 5.1617 | 14.0431 | No   |
| 27B     | 1        | 5.1621 | 14.0445 | No   |
| 28C     | 50       | 5.1615 | 14.0319 | No   |
| 29D(c)  | 99       | 5.1620 | 14.0248 | Yes  |
| 30E(c)  | 100      | 5.1636 | 14.0239 | Yes  |

TABLE XXI

| Example | Emissive Power Measured | % Nb Ref. | % $CaWO_4$ |
|---------|-------------------------|-----------|------------|
| 26A(c)  | 1088                    | 133       | 86         |
| 27B     | 2700                    | 120       | 214        |
| 28C     | 1277                    | 70        | 101        |
| 29D(c)  | 94                      | 20        | 7          |
| 30E(c)  | 524                     | 69        | 42         |

From the foregoing results it is clear that phosphors containing lower niobium concentrations (i.e., within the preferred ranges previously described) prepared in the presence of sodium and potassium exhibit high levels of emission, nearly equal to those obtained with potassium alone and higher than those obtained using sodium alone. The data indicate that increased emissions can be achieved up to a niobium level of 50 mole percent, based on niobium and tantalum combined.

Examples 31-35

These examples have as their purpose to demonstrate the effect of preparing the phosphors of Examples A-E in the presence of equal amounts of lithium and potassium.

Examples 31-35 were repetitions of Examples 1-5, except for variances in starting materials and performance noted in Tables XXII, XXIII and XXIV, which correspond to Tables I-III above.

TABLE XXII

| Example | mol % Nb | MgO   | $Ta_2O_5$ | $Nb_2O_5$ | $K_2SO_4$ | $Li_2SO_4$ |
|---------|----------|-------|-----------|-----------|-----------|------------|
| 31A (c) | 0        | 1.693 | 4.419     | 0.000     | 3.056     | 3.056      |
| 32B (c) | 1        | 1.693 | 4.375     | 0.027     | 3.047     | 3.047      |
| 33C (c) | 50       | 1.693 | 2.209     | 1.329     | 2.616     | 2.616      |
| 34D (c) | 99       | 2.540 | 0.066     | 3.947     | 3.277     | 3.277      |
| 35E (c) | 100      | 2.540 | 0.000     | 3.987     | 3.263     | 3.263      |

TABLE XXIII

| Example | mol % Nb | a-axis | c-axis  | Pure |
|---------|----------|--------|---------|------|
| 31A (c) | 0        | 5.1613 | 14.0460 | No   |
| 32B (c) | 1        | 5.1613 | 14.0471 | No   |
| 33C (c) | 50       | 5.1609 | 14.0470 | Yes  |
| 34D (c) | 99       | 5.1614 | 14.0383 | Yes  |
| 35E (c) | 100      | 5.1613 | 14.0416 | Yes  |

TABLE XXIV

| Example | Emissive Power Measured | % Nb Ref. | % $CaWO_4$ |
|---------|-------------------------|-----------|------------|
| 31A(c)  | 96                      | 12        | 8          |
| 32B(c)  | 423                     | 19        | 34         |
| 33C(c)  | 58                      | 3         | 5          |
| 34D(c)  | 0                       | 0         | 0          |
| 35E(c)  | 0                       | 0         | 0          |

From the foregoing results it is clear that the presence of significant levels of lithium during phosphor preparation deactivates the phosphor. By comparing the results with Examples 1-5 above it is apparent that the presence of potassium in combination with lithium does not increase phosphor emission.

Examples 36–38

These examples have as their purpose to demonstrate the effect of preparing the phosphors of Examples C–E in the presence of equal amounts of lithium and sodium.

Examples 36–38 were repetitions of Examples 3–5, except for variances in starting materials and performance noted in Tables XXV, XXVI and XXVII, which correspond to Tables I–III above.

TABLE XXV

| Example | mol % Nb | MgO | $Ta_2O_5$ | $Nb_2O_5$ | $Li_2SO_4$ | $Na_2SO_4$ |
|---|---|---|---|---|---|---|
| 36C(c) | 50 | 1.693 | 2.209 | 1.329 | 2.616 | 2.616 |
| 37D(c) | 99 | 2.540 | 0.066 | 3.947 | 3.277 | 3.277 |
| 38E(c) | 100 | 2.540 | 0.000 | 3.987 | 3.263 | 3.263 |

TABLE XXVI

| Example | mol % Nb | a-axis | c-axis | Pure |
|---|---|---|---|---|
| 36C(c) | 50 | 5.1616 | 14.0415 | No |
| 37D(c) | 99 | 5.1620 | 14.0370 | Yes |
| 38E(c) | 100 | 5.1621 | 14.0372 | No |

TABLE XXVII

| | | Emissive Power | |
|---|---|---|---|
| Example | Measured | % Nb Ref. | % $CaWO_4$ |
| 36C(c) | 0 | 0 | 0 |
| 37D(c) | 0 | 0 | 0 |
| 38E(c) | 100 | 13 | 8 |

From the foregoing results it is clear that the prescence of lithium during phosphor preparation deactivates the phosphor. By comparing the results with Examples 8–10 above it is apparent that the presence of sodium in combination with lithium does not increase phosphor emission.

Examples 39 and 40

These examples have as their purpose to demonstrate the effect of preparing the phosphors of Examples C–E in the presence of equal amounts of potassium and rubidium (Ex. 39) or potassium and cesium (Ex. 40).

Examples 39 and 40 were repetitions of Example 2, except for variances in starting materials and performance noted in Tables XXVIII, XXIX and XXX, which correspond to Tables I–III above.

TABLE XXVIII

| Example | mol % Nb | MgO | $Nb_2O_5$ | $Ta_2O_5$ | $K_2SO_4$ | $M_2SO_4$ |
|---|---|---|---|---|---|---|
| 39B | 1 | 1.693 | 2.027 | 4.375 | 3.047 | 3.047(M = Rb) |
| 40B | 1 | 1.693 | 2.027 | 4.375 | 3.047 | 3.047(M = Cs) |

TABLE XXIX

| Example | mol % Nb | a-axis | c-axis | Pure |
|---|---|---|---|---|
| 39B | 1 | 5.1617 | 14.0411 | No |
| 40B | 1 | 5.1619 | 14.0430 | No |

TABLE XXX

| | Emissive Power | | |
|---|---|---|---|
| Example | Measured | % Nb Ref. | % $CaWO_4$ |
| 39B | 3171 | 141 | 251 |

TABLE XXX-continued

| | Emissive Power | | |
|---|---|---|---|
| Example | Measured | % Nb Ref. | % $CaWO_4$ |
| 40B | 2896 | 128 | 230 |

From the foregoing results it is clear that the presence of either potassium and rubidium or potassium and cesium during phosphor preparation strongly increases the x-ray stimulated luminescence of the phosphor.

Examples 41–43

These examples have as their purpose to demonstrate phosphor preparation in which the anionic moiety of the alkali metal salt present during phosphor preparation is varied.

Three different phosphors were prepared by intimately mixing powders as indicated in Table XXXI in a ball mill followed by heating for 3 hours at 1250° C. in an alumina crucible.

TABLE XXXI

| Example | mol % Nb | MgO | $Ta_2O_5$ | $Nb_2O_5$ | K salt |
|---|---|---|---|---|---|
| 41 | 2.5 | 9.743 | 25.85 | 0.386 | 0.083 $K_2CO_3$ |
| 42 | 2.5 | 9.743 | 25.85 | 0.386 | 0.110 $K_2C_2O_4(H_2O)$ |
| 43 | 2.5 | 3.247 | 8.62 | 0.129 | 0.008 $KNO_3$ |

The x-ray excited prompt emission of the samples was measured by recording the voltage of an IP-28 TM photomultiplier when it was exposed to the light emitted by the sample irradiated by filtered x-rays from a tungsten x-ray source operated at 70 kVp and 10 mA. The filtration used for these experiments was 0.5 mm Cu and 1 mm Al. The results are reported below in Table XXXII as percent of a standard satisfying the formula $Mg_4Ta_{2-2x}Nb_{2x}O_9$, where $x=0.025$, prepared under identical conditions, but with no alkali metal salt being added.

TABLE XXXII

| Example | Response |
|---|---|
| 41 | 177 |
| 42 | 204 |
| 43 | 233 |

These results show that other alkali metal salts can be substituted for the alkali metal sulfates with high levels of x-ray stimulated luminescence being achieved.

Examples 44–47

These examples have as their purpose to demonstrate the phosphor preparation in the presence of an alkali metal sulfate and an alkali metal halide.

The general preparation procedure was similar to that of Examples 1–5 and performance was demonstrated similarly as in Examples 41–43. The starting materials employed as set out in Table XXXIII.

TABLE XXXIII

| Example | mol % Nb | MgO | $Ta_2O_5$ | $Nb_2O_5$ | $K_2SO_4$ | Halide |
|---|---|---|---|---|---|---|
| 44 | 2.5 | 3.225 | 8.617 | 0.129 | 4.812 | 0.0045 KF |
| 45 | 2.5 | 3.225 | 8.617 | 0.129 | 4.812 | 0.0058 KCl |
| 46 | 2.5 | 3.225 | 8.617 | 0.129 | 4.812 | 0.0094 KBr |
| 47 | 2.5 | 3.225 | 8.617 | 0.129 | 4.812 | 0.0131 KI |

TABLE XXXIV

| Example | Response |
| --- | --- |
| 44 | 359 |
| 45 | 322 |
| 46 | 344 |
| 47 | 344 |

Examples 48 and 49

The purpose of these examples is to demonstrate the x-ray stimulated luminescence achieved with a combination of potassium and sodium even in the presence of a small amount of lithium in preparing a magnesium tantalum niobium oxide containing 1 mole percent niobium.

Example 48

$Mg_4Ta_{2-2x}Nb_{2x}O_9$ (x=0.01) was prepared by heating the following quantities of intimately mixed powders for 12 hours at 1400° C. in an alumina crucible:

| Example | mol % Nb | MgO | Ta₂O₅ | Nb₂O₅ |
| --- | --- | --- | --- | --- |
| 48 | 1 | 8.469 | 21.87 | 0.133 |

The resulting phosphor powder was pulverized and sieved through a 400 mesh sieve (U.S. Sieve Series). The sieved phosphor was dispersed in a 13% solution of Permuthane U-6366 TM polyurethane using a methylene chloride/methanol solvent at a phosphor to binder weight ratio of 13:1, hand coated onto a blue tinted polyethylene terephthalate support, and overcoated with cellulose acetate. The measured phosphor coverage for the coating was approximately 6.24 mg/dm² (58 g/ft²).

Example 49

The purpose of this example is to demonstrate the tolerance of a small quantity of lithium during the preparation of the phosphor with high levels of x-ray stimulated luminescence being achieved by a combination of potassium and sodium.

The following quantities of powders were intimately mixed then heated for 3 hours at 1250° C. in an alumina crucible. The mixed $K_2SO_4/Na_2SO_4/Li_2SO_4$ flux was leached out with hot water, and the product was collected by suction filtration, rinsed with acetone, and dried in air.

| Example | mol % Nb | MgO | Ta₂O₅ | Nb₂O₅ | K₂SO₄ | Na₂SO₄ | Li₂SO₄ |
| --- | --- | --- | --- | --- | --- | --- | --- |
| 49 | 1 | 8.465 | 21.87 | .133 | 30.17 | 0.305 | 0.001 |

The resulting phosphor powder was preapred and coated similarly as in Example 48.

The radiographic intensifying screens of Examples 48 and 49 were were mounted in a light tight cassette along with suitable standards containing a sheet of Kodak XK TM film. A uniform flash x-ray exposure was done with an x-ray generator using a tungsten source operating at 70 kVp. The exposed film was then processed using a Kodak RP X-Omat TM processor model M6B with the developer and fixer solutions sold under the same trademark. The optical densities of the exposed portions of the developed film were determined using a densitometer and recorded. The measured values of optical density were converted to relative exposure values using the sensitometric curve for the film generated with an intensity scale x-ray sensitometer. The amount of emitted light measured in this fashion for each sample is used as a measure of the relative speed of the screen. The results reported here have been normalized so that Example 48 has a defined radiographic speed of 100. The results of the screen comparison are presented below.

| Example | Radiographic Speed |
| --- | --- |
| 48 | 100 |
| 49 | 223 |

Examples 50–59

Preparation of $Mg_4Ta_2O_9$ and $Mg_4Ta_{2-2x}Nb_{2x}O_9$ phosphors

Table XXXV lists the gram quantities of reactants which were ground in a mortar and pestle, then placed in an alumina crucible. Each sample was heated 20 hours at 1400° C. with one intermediate grinding after 10 hours. The final product was a white powder, and the major phase was identified as satisfying the title composition by x-ray powder diffraction.

Visual examination of each sample during irradiation with 70 Kvp tungsten x-rays proved that the sample was an x-ray excitable luminophore, the primary emission appearing blue to the eye. The PMT response, indicated in Table XXXV, is the relative x-ray response of the samples where the National Bureau of Standards 1026 CaWO₄:Pb standard is defined as giving a PMT response equal to 100. The sample PMT measurements are reported as percentages of the NBS 1026 standard. The x-ray response measurements were taken using a tungsten target x-ray source in an XRD 6 generator. The x-ray tube was run at 70 kVp, 10 mA, and the radiation from the tube was filtered through 0.5 mm Cu and 1 mm Al filters before reaching the sample. The luminescent response of the powders, packed in 2.54 cm diameter×6 mm thick planchettes, was measured using an IP-28 photomultiplier tube at 500 V bias. The voltage from the photomultiplier tube was measured with a Keithley high impedance electrometer, and is proportional to the total light output of the sample.

TABLE XXXV

| Example | MgO | Ta₂O₅ | Nb₂O₅ | PMT |
| --- | --- | --- | --- | --- |
| 50 | 1.6124 | 4.4167 | .0013 | 252 |
| 51 | 1.6124 | 4.4155 | .002 | 278 |
| 52 | 1.6124 | 4.3968 | .0133 | 387 |
| 53 | 1.6124 | 4.3084 | .066 | 370 |
| 54 | 1.6124 | 4.1979 | .133 | 500 |
| 55 | 1.6124 | 4.0874 | .1993 | 500 |
| 56 | 1.6124 | 3.9770 | .266 | 404 |
| 57 | 1.6124 | 3.8665 | .332 | 434 |
| 58 | 1.6124 | 3.756 | .399 | 369 |
| 59(c) | 1.6124 | 4.4189 | 0.0 | 108 |
| Control | Sample | | Calcium Tungstate | 100 |

The niobium concentration range spanned in Table XXXV is from 0 mole percent to 17 mole percent niobium substitution based on the total moles of pentavalent cation present in the host lattice, $Mg_4Ta_2O_9$. It is clear from Table XXXV that niobium is an activator for $Mg_4Ta_2O_9$, and that the niobium substituted materials are superior x-ray phosphors, with significantly higher PMT values than the NBS 1026 calcium tungstate reference powder to which they were compared.

Example 60

Figure 2:
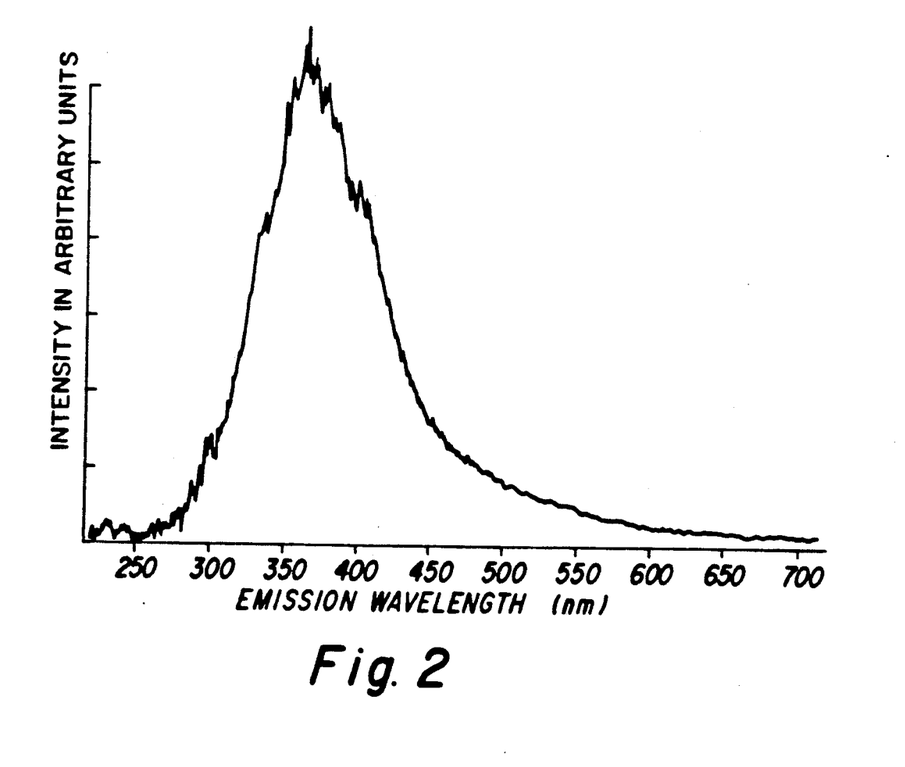
FIGS. 2–4 are x-ray excited prompt emission spectra.

Preparation of $Mg_4Ta_2O_9$ Using a Flux 1.612 g of MgO and 4.419 g of $Ta_2O_5$ were ground in a mortar and pestle along with 1.5 g of $K_2SO_4$ as a flux. The sample was placed in an alumina crucible and heated for 8 hours at 1300° C. The sample was then crushed and the majority of the flux removed by washing with 500 mls of hot distilled water. The sample was then collected by suction filtration and allowed to dry. Photomicrographs and x-ray powder diffraction showed that the $K_2SO_4$ flux aids the crystallization of the $Mg_4Ta_2O_9$ phase. The product is a free-flowing white powder. Measurement of the luminescence of the powder sample under x-ray radiation as described in Examples 50–59 gave a PMT reading which was approximately twice that of the NBS 1026 calcium tungstate standard powder. The x-ray excited prompt emission spectrum of this powder was taken using the filtered x-ray source described in Example 2. The tube was operated at 70 kVp and 30 mA. The spectrum was acquired with an Instruments S.A. Model HR 320 grating spectrograph equipped with a Princeton Applied Research Model 1422/01 intensified linear diode array detector. The data acquisition and processing was controlled by a Princeton Applied Research Model 1460 OMA III optical multi-channel analyzer. The spectrum has been corrected for the spectral response of the detector-monochromator combination. The x-ray excited emission spectrum of this sample is shown in FIG. 2. FIG. 2 shows that $Mg_4Ta_2O_9$ is a blue emitting prompt emission x-ray phosphor.

Examples 61–70

Preparation of $Mg_4Ta_{2-2x}Nb_{2x}O_9$ Using a Flux

Table XXXVI lists the gram amounts of starting materials which were used to prepare phosphors using a $K_2SO_4$ flux. The amount of flux used, which is nominally 25 percent by weight of starting materials, is also given.

TABLE XXXVI

| Example | MgO | $Ta_2O_5$ | $Nb_2O_5$ | Flux |
|---|---|---|---|---|
| 61(c) | 1.612 | 4.418 | 0 | 1.51 g |
| 62 | 1.612 | 4.417 | .001 | 1.51 g |
| 63 | 1.612 | 4.414 | .002 | 1.51 g |
| 64 | 1.612 | 4.397 | .013 | 1.50 g |
| 65 | 1.612 | 4.375 | .0265 | 1.50 g |
| 66 | 1.612 | 4.308 | .066 | 1.50 g |
| 67 | 1.612 | 4.198 | .133 | 1.48 g |
| 68 | 1.612 | 3.977 | .266 | 1.46 g |
| 69 | 1.612 | 3.756 | .399 | 1.43 g |
| 70 | 1.612 | 3.535 | .531 | 1.42 g |

Each sample was ground in a mortar and pestle, then placed in an alumina crucible and heated for 10 hours at 1300° C. The samples were then crushed and the majority of the flux leached from the phosphor with hot distilled water. The phosphor powders were then collected by suction filtration. The product in each case was a free-flowing white powder. X-ray powder diffraction indicated that a hexagonal (ordered corundum) crystal structure was maintained in these phosphors.

X-ray luminescence measurements were taken using the method described in Examples 50–59. The results are listed below in Table XXXVII, along with the nominal niobium activator concentration expressed as mole percent of total pentavalent cation present.

TABLE XXXVII

| Example | % Nb | PMT |
|---|---|---|
| 61(c) | 0 | 181 |
| 62 | 0.05 | 267 |
| 63 | 0.1 | 358 |
| 64 | 0.5 | 392 |
| 65 | 1.0 | 435 |
| 66 | 2.5 | 391 |
| 67 | 5.0 | 373 |
| 68 | 10.0 | 269 |
| 69 | 15.0 | 186 |
| 70 | 20.0 | 136 |
| Control | Calcium Tungstate | 100 |

Figure 3:
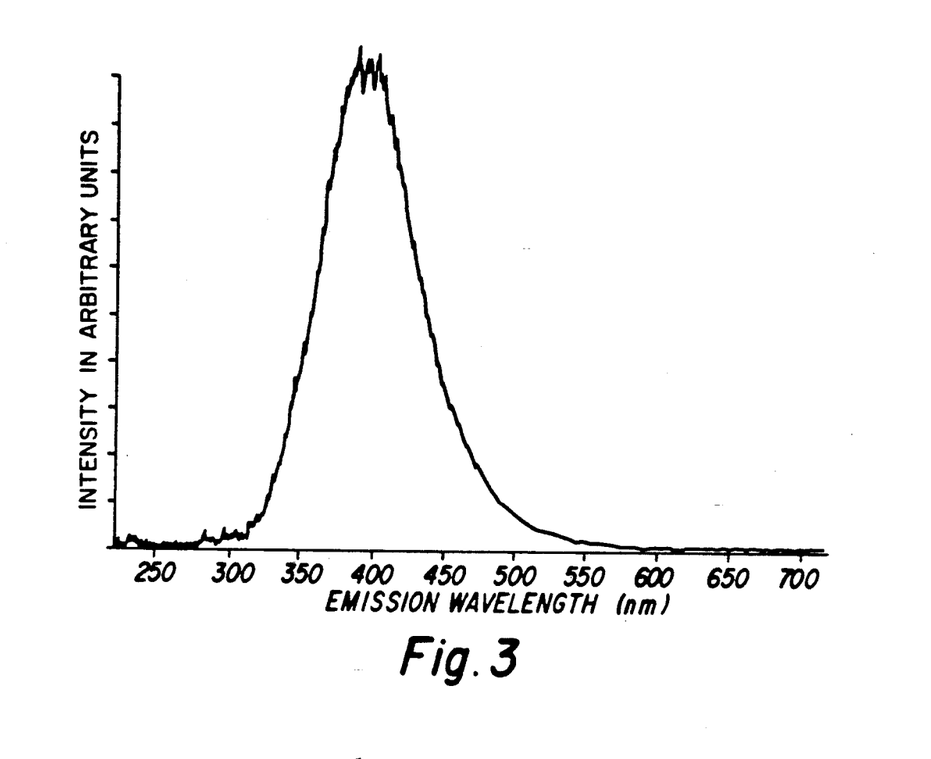

Table XXXVII shows that the phosphors prepared by a flux method gave larger relative PMT values than the NBS standard 1026 $CaWO_4$:Pb powder. The X-ray excited prompt emission spectrum of a phosphor containing a nominal composition 2.5 mole percent niobium and prepared using 40 weight percent $K_2SO_4$ as a flux is shown in FIG. 3. The spectrum was acquired as described in Example 60.

Example 70

Preparation of a Radiographic intensifying screen 16.12 g MgO, 43.75 g $Ta_2O_5$, 0.265 g $Nb_2O_5$, and 15.0 g $K_2SO_4$ were separately ground in a mortar and pestle then added together and ball milled for one hour. The sample was then placed in an alumina boat and heated for 10 hours at 1300° C. in air. The sample was removed, crushed with a mortar and pestle, then washed with 3 one-liter portions of hot water to remove the flux. The sample was collected by suction filtration. The product was a free-flowing white powder consisting of regularly shaped polyhedral particles between 2 and 20 microns in size. The sample was then passed through a 400 mesh sieve, and the product was collected.

The sieved phosphor was then dispersed in a 15% solution of Permuthane U-6366 ® polyurethane using a methylene chloride/methanol solvent at a phosphor to binder weight ratio of 8.5:1. The dispersion was then hand-coated onto a blue dyed polyethylene terephthalate support and overcoated with cellulose acetate. The measured phosphor coverage for the coating was approximately 646 g/m².

Figure 4:
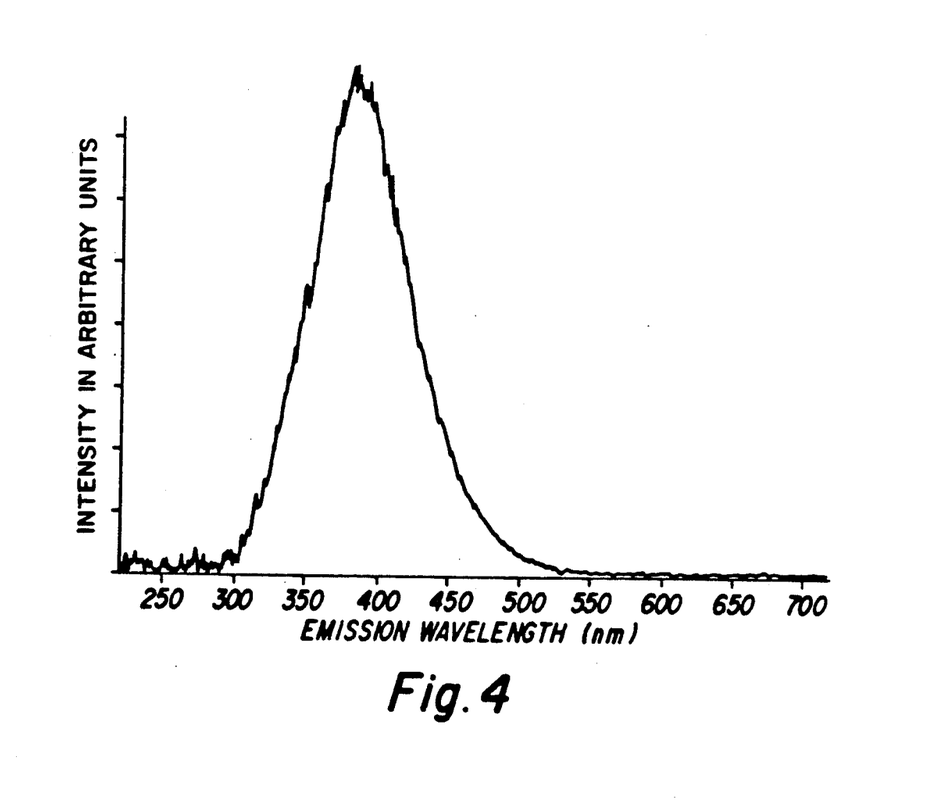

The emission spectrum of a 25.8 cm² piece of the coating is shown in FIG. 4. The spectrum was obtained using the methods described in Example 12, with the exception that a 25.8 cm² piece of screen was used in place of a planchette filled with sample. The relative integrated emissive power from the screen under these experimental conditions was 292 (arbitrary units). For comparison, a 25.8 cm² piece of a standard 100 speed $CaWO_4$ screen has a relative integrated emissive power of 100 (arbitrary units) under identical conditions. This example demonstrates that radiographic intensifying screens made from a phosphor satisfying the requirements of the invention have a larger emissive power than a $CaWO_4$ screen.

Example 72

Preparation and Use of a Radiographic Intensifying Screen

A mixture of 3.225 g MgO, 8.749 g $Ta_2O_5$, 0.053 g $Nb_2O_5$, and 4.811 g $K_2SO_4$ was thoroughly ground in an agate mortar and pestle, then placed in a 20 ml alumina crucible and heated for 3 hours at 1250° C. in air. After cooling the sample was crushed, washed with hot water to remove the flux, then collected by suction filtration. The product was a free-flowing white powder consisting of regularly shaped polyhedral particles of between 2 and 10 microns in size. The sample was then passed through a 400 mesh sieve and the product collected. This preparation was repeated 12 times.

The sieved phosphor was dispersed in a 13% solution of Permuthane U-6366 TM polyurethane using a methylene chloride/methanol solvent at a pigment to binder ratio of 10:1, hand coated onto a blue dyed polyethylene terephthalate support, and overcoated with cellulose acetate. The measured phosphor coverage for the screen was approximately 377 g/m².

A pair of screens from the coating described above were used with Kodak X-Omat K TM film to take radiographs of a radiographic phantom. Kodak X-Omat K TM film is a commonly used double-sided blue sensitive medical x-ray film. The radiographs were made using 70 kVp x-rays from a single phase medical x-ray generator. The exposed film was then processed using a Kodak RP X-Omat TM processor model M6AW using developer and fixer solutions sold under the same trademark. For a control, radiographs using a pair of commercially available Kodak X-Omatic TM regular screens with Kodak X-Omat K TM film were taken under identical conditions using the same radiographic phantom.

The screens were approximately 10% slower than the control Kodak X-Omat regular screens. The radiograph of the radiographic phantom made with the screen of this example was sharper than the control, and the visibility of low contrast detail in the radiographic phantom was equivalent to the control.

These results demonstrate that the x-ray intensifying screens of the invention are suitable for use with existing radiographic films.

The invention has been described in detail with particular reference to preferred embodiments thereof, but it will be understood that variations and modifications can be effected within the spirit and scope of the invention.

What is claimed is:

1. An x-ray intensifying screen comprised of
a support and
a fluorescent layer containing a polymeric binder and a particulate phosphor in an ordered corundum crystalline form consisting essentially of $$Mg_4Ta_{2-2x}Nb_{2x}O_9:M_yNa_{y'}$$

where
M is at least one of potassium, rubidium and cesium,
y is at least $2 \times 10^{-3}$,
x is in the range of from $5 \times 10^{-4}$ to 0.5, and $y+y'$ is less than 1.0.

2. An x-ray intensifying screen according to claim 1 in which x is in the range of from $5 \times 10^{31\ 3}$ to 0.1.

3. An x-ray intensifying screen according to claim 1 in which y is in the range of from $2 \times 10^{31\ 3}$ to 0.5.

4. An x-ray intensifying screen according to claim 1 in which $y+y'$ is up to 0.5.

5. An x-ray intensifying screen according to claim 4 in which $y+y'$ is up to 0.2.

6. An x-ray intensifying screen according to claim 1 in which M is potassium alone or in combination with at least one of cesium and rubidium.

7. An x-ray intensifying screen according to claim 1 in which M is rubidium alone or in combination with at least one of potassium and cesium.

8. An x-ray intensifying screen according to claim 1 in which M is cesium alone or in combination with at least one of potassium and rubidium.

9. An x-ray intensifying screen comprised of
a support and
a fluorescent layer containing a polymeric binder and a particulate phosphor in an ordered corundum crystalline form consisting essentially of $$Mg_4Ta_{2-2x}Nb_{2x}O_9:K_yNa_{y'}$$

where
x is in the range of from $5 \times 10^{-4}$ to 0.5,
y is at least $2 \times 10^{-3}$, and
$y+y'$ is up to 0.5.

10. An x-ray intensifying screen according to claim 9 in which
x is in the range of from $5 \times 10^{-3}$ to 0.1.
y is at least $5 \times 10^{-3}$, and
$y+y'$ is up to 0.2.

11. An x-ray intensifying screen comprised of
a support and
a fluorescent layer containing a polymeric binder and a particulate phosphor in an ordered corundum crystalline form consisting essentially of $$Mg_4Ta_{2-2x}Nb_{2x}O_9:Rb_yNa_{y'}$$

where
x is in the range of from $5 \times 10^{-4}$ to 0.5,
y is at least $2 \times 10^{-3}$, and
$y+y'$ is up to 0.5.

12. An x-ray intensifying screen according to claim 11 in which
x is in the range of from $5 \times 10^{-3}$ to 0.1.
y is at least $5 \times 10^{-3}$, and
$y+y'$ is up to 0.2.

13. An x-ray intensifying screen comprised of
a support and
a fluorescent layer containing a polymeric binder and a particulate phosphor in an ordered corundum crystalline form consisting essentially of $$Mg_4Ta_{2-2x}Nb_{2x}O_9:Cs_yNa_{y'}$$

where
x is in the range of from $5 \times 10^{-4}$ to 0.5,
y is at least $2 \times 10^{-3}$, and
$y+y'$ is up to 0.5.

14. An x-ray intensifying screen according to claim 13 in which
x is in the range of from $5 \times 10^{-3}$ to 0.1.
y is at least $5 \times 10^{-3}$, and
$y+y'$ is up to 0.2.

* * * * *